United States Patent [19]

Berrebi

[11] Patent Number: 5,169,819

[45] Date of Patent: Dec. 8, 1992

[54] PROCESS OF PRESULFURATION OF HYDROCARBON PROCESSING CATALYST AND CATALYST PRODUCED BY THE PROCESS

[75] Inventor: Georges Berrebi, Bourg les Valence, France

[73] Assignee: Europeenne de Retraitement de Catalyseurs, La Voulte sur Rhone, France

[21] Appl. No.: 773,647

[22] PCT Filed: Mar. 23, 1990

[86] PCT No.: PCT/FR90/00195

§ 371 Date: Oct. 17, 1991

§ 102(e) Date: Oct. 17, 1991

[87] PCT Pub. No.: WO90/12647

PCT Pub. Date: Nov. 1, 1990

[30] Foreign Application Priority Data

Apr. 19, 1989 [FR] France ................... 89 05302
Jul. 20, 1989 [FR] France ................... 89 09928

[51] Int. Cl.⁵ .......................... B01J 27/04; B01J 31/02
[52] U.S. Cl. ........................... 502/168; 502/216
[58] Field of Search ........................ 502/168, 216

[56] References Cited

U.S. PATENT DOCUMENTS 4,719,195  1/1988  Toulhoat et al. .................. 502/216

FOREIGN PATENT DOCUMENTS 153233  8/1985  European Pat. Off. .
276681  8/1988  European Pat. Off. .

Primary Examiner—W. J. Shine
Attorney, Agent, or Firm—Millen, White, Zelano and Branigan

[57] ABSTRACT

For the sulfuration a new or regenerated catalyst, containing a support with a base of at least one metal oxide or a metalloid, and at least one active metal, the catalyst is impregnated in the absence of hydrogen with an aqueous ammonium sulfide solution at a temperature between 0° and 50°, in the presence of at least one sulfur additive selected in the group consisting of thiodazoles, thio acids, thio amides, thiocyanates, thio esters, thiophenols, thiosemicarbazides, thioureas, mercapto alcohols of formula $$\begin{array}{c} R_1 \quad\quad R_3 \\ | \quad\quad\quad | \\ HS-(C)_n-(C)_m-OH \\ | \quad\quad\quad | \\ R_2 \quad\quad R_4 \end{array}$$

where n and m are whole numbers, $R_1$, $R_2$, $R_3$, $R_4$, identical or different, are atoms of hydrogen or alkyl, aryl, aralkyl, alkylaryl organic radicals, thiols of formula $R_1$—SH where R is an organic radical, thio ethers of formula $R_1$—S—$R_2$ where $R_1$ and $R_2$ are defined as above and the organic disulfides of formula $R_1$—S—S—$R_2$ where $R_1$ and $R_2$ are defined as above.

18 Claims, No Drawings

PROCESS OF PRESULFURATION OF HYDROCARBON PROCESSING CATALYST AND CATALYST PRODUCED BY THE PROCESS

BACKGROUND OF THE INVENTION

This invention relates to a process of presulfuration of a hydrocarbon processing catalyst. The invention is an improvement of the process described in patent EP-B-153233 of the applicant.

It is often desirable to proceed to a sulfuration (generally called "presulfuration") of metals entering the composition of certain catalysts for refining and/or hydroconversion of hydrocarbons either when these catalysts are new or at the end of the regeneration of these catalysts before reusing them.

A presulfuration of the new or regenerated catalysts is thus desirable for the use of these catalysts in the refining reactions, for example, the reactions of desulfuration or hydrodesulfuration of various gasolines, for example, gasolines of catalytic cracking or steam cracking whose sulfur content it is suitable to lower, before use, without modifying the octane number of these gasolines or by modifying it as little as possible.

The catalyst used for this type of desulfuration or hydrodesulfuration contains a generally nonacid support, for example, an alumina or alumina mixtures (U.S. Pat. No. 4 334 982) or any other suitable support with a base of at least one oxide of a metal, e.g., magnesia or metalloid (U.S. Pat. Nos. 4,132,632, 4,140,626), silica, silica-aluminas, silica-magnesias, fluorosilicas, boron aluminas, clays, carbons, fluroaluminas), this mixture or these mixtures of supports able to be at least partly in amorphous form or in crystallized form (zeolites) and the catalyst further containing 0.2 to 30% of at least one active metal of groups VI, VIII or the like selected, for example, from the group consisting of cobalt, molybdenum, nickel and tungsten (U.S. Pat. No. 3,732,155 and 3,804,748).

A sulfuration or presulfuration of regenerated catalyst is also desirable in the reactions of hydrocarbon hydroreforming (reforming in particular of a naphtha) and of aromatic hydrocarbon production ("aromizing"), for example, the production of benzene, toluene and xylenes (ortho, meta or para), either from gasolines that are unsaturated or unsaturated (for example, gasolines of pyrolysis, cracking, in particular steam cracking, or catalytic reforming), or else from naphthenic hydrocarbons capable of being transformed into aromatic hydrocarbons by dehydrogenation.

The catalyst can contain, for example, at least one metal of the family of platinum, i.e., a noble metal such as platinum, palladium, iridium, rhodium, ruthenium, osmium deposited on a suitable support (alumina, silica, silica-alumina, fluoroaluminas, flurosilicas, zeolite, etc... or mixtures of such supports).

A sulfuration (presulfuration) of a new or regenerated catalyst is also suitable, in some cases, for the partial or total catalyst sulfuration, also with a base of one of the supports already cited at least one of the active metals already cited, usable in reactions, hydrocarbon conversions such as the reactions of hydrogenation, dehydrogenation, alkylation, hydroalkylation, dealkylation, hydrodealkylation, steam dealkylation, isomerization and hydrodemetalization of the heavy batches.

The metals of catalysts used in refining, hydrorefining or petrochemistry, whether they are new or regenerated, are most often in oxidized form, at times in metal form (for some metals of reforming catalysts, in particular). Now, the metals of these catalysts, often being active only in sulfur form or at least partially sulfur form, it is therefore necessary for the refiner or the petrochemist to perform a sulfuration of the catalyst before its use.

The regeneration of the catalysts is now performed increasingly by a specialist of catalyst regeneration, at times far from the industrial unit. Now, it seems reasonable to think of restoring to the refiner a product ready for use, which makes possible the original and efficient process of the applicant described in EP.B.153233.

When the catalyst is to be subjected, from its start preferably on the site ("in situ"), to the standard activation reaction in the presence of hydrogen (generally above 100° C.), this process makes it possible then to proceed, thanks to the presence of hydrogen on the site, to the sulfuration at required rates, stoichiometric or nonstoichiometric, of the active metal or metals entering the composition of the catalyst. The process consists in incorporating ammonium sulfide in the absence of hydrogen in the porosity of the new or regenerated catalyst.

In this process, the catalyst is generally impregnated "ex situ" in the absence of hydrogen with an aqueous ammonium sulfide solution $(NH_4)_2$ at a temperature between 0° and 50° C., preferably between 10° to 35° C. and, for example, at room temperature to incorporate the suitable degree of sulfur in the porosity of the catalyst, the processing of the catalyst then being followed by a drying of this catalyst, for example, at a temperature lower than 120° C. and preferably between 95° and 115° C. Above 120° C., it has been seen that the sulfur was partially eliminated from the catalyst.

One of the advantages of the process is to be able to proceed to the presulfuration of the catalyst only in the presence of an aqueous solution. It has been proposed by the applicant in U.S. Pat. No. 4,719,195 to introduce organic polysulfides in the porosity of the catalytic batch; now, this last method presents the drawback of performing the presulfuration in the presence of an organic solvent of "white spirit" type that is more difficult to eliminate than the water at the end of the process. This process further presents the advantage of being able to use the commercial ammonium sulfide solution just as it is.

SUMMARY OF THE INVENTION

A means has now been discovered, within the scope of this invention, to improve the presulfuration of the catalyst, a means which will be reflected in particular by a longer stability of the catalysts during prolonged tests.

This means consists in performing the incorporation of the ammonium sulfide in the porosity of the catalyst, in the presence of at least one particular sulfur additive.

By weight, advantageously 5 to 50%, preferably 10-40% and more particularly 15-30% of the additive or additives selected will be used relative to the weight of sulfur introduced in the catalyst.

The additive or additives can be added, for example, with the solution of ammonium sulfide, either in the pure state or dissolved in a suitable solvent, water in particular.

The role of this additive is to increase the incorporation of sulfur in the catalyst. In a preferred method, ammonium sulfide can be introduced on the catalyst during a first impregnation. Then, during a second impregnation, the additive (in aqueous solution or not) can be added alone or mixed with ammonium sulfide.

Thus, in a more particular way, and in particular when it is desired to transform into sulfides all the oxides of the promoter metals that the catalyst contains, the process then consists:

(a) in impregnating the catalyst at a temperature between 0° and 50° C. to its impregnation volume by an aqueous ammonium sulfide solution $(NH_4)_2S$ (preferably, the procedure is performed between 10° and 35° C.), (b) in drying the catalyst at a temperature less than 120° C. and preferably between 95° to 115° C., (c) in impregnating again (between 0° and 50° C., preferably between 10° and 35° C.) at least a second time the catalyst to its impregnation volume or to a smaller volume, as a function of the amount of sulfur to be introduced in the catalyst, by a mixture of an aqueous ammonium sulfide solution $(NH_4)_2S$ and an additive according to the invention, (d) in drying the catalyst at a temperature less than 130° C. and preferably between 90° and 120° C. and more particularly in the vicinity of 100° C.

Optionally, if necessary, for the case where large amounts of sulfur are to be preintroduced into the catalyst, other impregnations of the catalyst will be performed with an ammonium sulfide solution and/or the additive, each of them being followed by a drying at a temperature less than 120° C.

Thus, it can be necessary to perform several impregnations because the pore volume of the catalyst is not sufficient to absorb, during the first impregnation, the entire theoretical aqueous solution of ammonium sulfide and/or the additive containing the amount, stoichiometric or not, of sulfur that is proposed to introduce into the catalytic batch (a commercial ammonium sulfide solution contains at a maximum 20% by weight of sulfur and to wish then to concentrate such solutions would be reflected by the decomposition of ammonium sulfide).

The drying which follows the first ammonium disulfide impregnation is preferably performed in a gas containing molecular oxygen and in particular in the air.

It thus is possible to perform the invention in the presence of a sulfur additive selected from the group consisting of thiodiazoles, thio acids, thio amides, thiocyanates, thio esters, thiophenols, thiosemicarbazides and thioureas. By way of example, thiobenzoic acid, 2-thiocresol, 3-thiocresol, 4-thiocresol, 3,3′-thiodipropionic acid, 3,3′-thiodipropionitrile, 2,3,6-trimethyl thiophenol, methyl thioglycolate, 4-methyl-3-thiosemicarbazide, naphthalene-2-thiol, phenyl isothiocyante, 2-phenyl thiophenol, thioacetamide, thiobenzamide, 2,6-dimethyl thiophenol, 3,5-dimethyl thiophenol, 2,2′-dinitrodiphenyl disulfide, 2,5-dithiobiurea, ethyl thioglycolate, 2-methoxy thiophenol, 3-methoxy thiophenol, 2-methyl-5-mercapto-1,3,4-thiadiazole, amidinothiourea, 2-amino-5-ethylthio-1,3,4-thiadiazole, 2-amino-5-mercapto-1,3,4-thiadiazole, 3-amino-5-mercapto-1,2,4-triazole, 2-amino thiophenol, benzene-1,3-dithiol, 3-chlorothiophenol and 2,5-dimercapto-1,3,4-thiadiazole (D.M.T.D.), can be cited.

But the invention can also be performed in the presence of other types of sulfur additives. It is thus possible to cite the mercapto alcohols of formula:

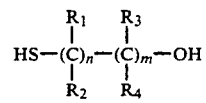

where n and m are whole numbers, $R_1$, $R_2$, $R_3$, $R_4$, identical or different, are hydrogen atoms or alkyl, aryl, aralkyl, alkylaryl organic radicals, etc... , preferably having 1 to 20 carbon atoms per molecule; preferably 1 to 6 carbon atoms per molecule; preferably n=1–10 (for example 1-2) and m=1–10 (for example 1-2).

By way of example, 2-mercaptoethanol, 1-mercapto-2-propanol, 1-mercapto-2-butanol, 3-mercapto-1-propanol, 1-mercapto-2-hexanol, 2-mercaptocyclohexanol, 2-mercaptocyclopentanol, 3-mercaptobicyclo-(2,2,1)-heptane-2-ol-mercapto-2-pentanol, 1-mercapto-2-phenyl-2-ethanol, 3-mercapto-3-phenyl-propan-1-ol, 2-mercapto-3-phenyl-propan-1-ol, thioglycerol, 9-mercapto-10-hydroxyoctadecanoic acid and 10-mercapto-10-hydroxyoctadecanoic acid will be cited. More particularly, the compounds of formula HS—$CH_2$—$CH_2$OH (2-mercaptoethanol) and HS—$CH_2$—C ($C_6H_5$) H—OH (1-mercapto-2-phenyl-2-ethanol) will be cited.

It is possible to use, in a more general way, the thios (thioalcohols, mercaptans, thiophenols) of formula $R_1$—SH where R is an organic radical, thio ethers of formula $R_1$—S—$R_2$ organic sulfides of formula $R_1$—S—S—$R_2$ or else HO—$R_1$—S—S—$R_2$—OH.

Thus, alkylmercaptans (such as n-butyl mercaptan, n-hexylmercaptan), monothioglycols (such as monothioethylene glycol), dithioglycols, such as dithiopropylene glycol, arylmercaptans already cited above (thiophenols) (such as thiophenol, thiocresols), dithiobenzenes (such as dithioresorcinol), heterocycles substituted by mercapto groups (such as mercaptopyridine, mercaptopyrimidine, etc...) will be cited. As an example of thio ethers, dialkyl sulfides (such as di-n-butyl sulfides, di-tert-butyl sulfides), dihydroxyalkyl sulfides (such as thiodiethylene glycol (S($CH_2CH_2OH)_2$), thiodipropylene glycol, etc...), diaryl sulfides (diphenyl sulfide, etc...), diaralkyl sulfides (dibenzyl sulfide, etc...), alkyl ethers, thiophenols (thioanisole, etc...), cyclic thio ethers and their substituted derivatives (ethylene sulfide, thiophene, thiazole, thiopyrone, thioxanthone, thioxanehydrol, 1,4-thioxane, etc..., S-alkyl ethers of heterocycles substituted by mercaptans (2-methylthio-4,6-diamino pyridimine, etc...) will be cited.

Of the families of the preceding compounds, dimethyl sulfoxide, ethylthiol ethanol, thioglycolic acid, dithioglycol and the organic disulfides of formula, in particular, HO—$R_1$—S—S—$R_2$—OH or HO—$(CH_2)_x$—S—$(CH_2)_{x'}$—S—$(CH_2)_{x''}$—OH where $R_1$ and $R_2$ are defined as above, where x, x′ and x″, identical or different, are a whole number, will be cited.

It is also possible to cite more particularly by way of another example, diethanol disulfide or 2,2-dithiobis ethanol of formula (D.E.O.D.S.)

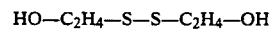

soluble particularly in water, glycols and polyglycols.

EXAMPLES

The tests performed have as their object to prepare an easily processible catalytic batch, to reduce the investment costs to obtain an economically viable output, to be able to rely on the ex-situ regeneration units and to provide a saving of time to the refiner while facilitating the reuse of the catalytic batch.

It is recalled that the basis of the sulfuration of a catalyst according to the process of the invention is the same as in the prior art, namely the use of a mixture of hydrogen and hydrogen sulfide:

$$MoO_3 + 2H_2S + H_2 \rightarrow MoS_2 + 3H_2O + Q \quad (1)$$

$$9CoO + 8H_2S + H_2 \rightarrow Co_9S_8 + 9H_2O + Q \quad (2)$$

$$3NiO + 2H_2S + H_2 \rightarrow Ni_3S_2 + 3H_2O + Q \quad (3)$$

The principle of the process consists in charging the catalyst by ammonium sulfide mixed or not with DEDS (diethanol disulfide). This is carried out by adsorption of this compound or these compounds in the porosity of the catalyst. The catalyst thus processed is subsequently activated in the reactor of the refinery by passage of hydrogen heated, for example, between 80 and 200° C. The sulfur product releases $H_2S$, the sulfuration of the oxides is then performed according to the known techniques recalled above.

Some tests were made on a new Ketjen 165/1.5 E catalyst, calcined at 550° C., new or regenerated.

EXAMPLE 1 (COMPARATIVE)

The tested sulfuration agent (or reagent) is ammonium sulfide.

The handling is performed by submerging a given amount of catalyst in an excessive volume of the reagent. The impregnation lasts for 1 hour.

It is proposed to introduce ammonium sulfide in the new or regenerated Ketjen catalyst whose support is of alumina and which contains 15.4% by weight of molybdenum oxide $MoO_3$ and 4.23% by weight of cobalt oxide CoO. The object of the operation is that, subsequently, on the site where this catalyst will be used, a hydrogen preprocessing of the catalyst can transform all the molybdenum oxide into molybdenum sulfide $MoS_2$ and all the cobalt oxide into cobalt sulfide of formula $Co_9S_8$. The pore volume of the catalyst is 46 ml per 100 grams of dry catalyst.

It is possible to calculate the weight of sulfur (molecular weight: 32) that it is suitable to introduce in the porosity of the catalyst to transform all the molybdenum and cobalt oxides into sulfides ($MoS_2$ and $Co_9S_8$). 15.4 g of molybdenum oxide (molecular weight of $MoO_3$: 144) in 100 grams of catalyst corresponds to (see reaction (1), previous page):

$15.4/144 \times 2 \times 32 = 6.844$ g of sulfur in these 100 grams of catalyst.

Likewise, 4.23 g of cobalt oxide (molecular weight: 75) in 100 grams of catalyst corresponds to (see reaction (2), previous page):

$4.23/75 \times 8/9 \times 32 = 1.604$ g of sulfur in these 100 grams of catalyst.

It is therefore necessary to incorporate in total $6.844 + 1.604 = 8.448$ g of sulfur in 100 grams of catalyst. To perform this operation, a 20% commercial aqueous solution ammonium sulfide $(NH_4)_2S$ (molecular weight: 68) will be used; 100 ml of such a solution contains: 0.294 molecule of $(NH_4)_2S$ or 0.294 sulfur atom or 9.41 g of sulfur. Since it is necessary to introduce 8.448 g of sulfur in 100 g of catalyst, it will be suitable to use 89.77 ml of said commercial solution per 100 grams of catalyst, this volume thus corresponding to about two times the pore volume of the catalyst (46 ml per 100 g), therefore to the necessity of performing here two successive impregnations of the catalyst.

During a first impregnation, 46 ml of the commercial ammonium sulfide solution in introduced in the catalyst, at regular temperature. It is dried at 105° C. for about two hours, under air. A second impregnation is then performed by 46 ml of the commercial solution and it is dried at 100° C. for about two hours, under nitrogen. At this stage, the catalyst contains 8.6 grams of sulfur per 100 grams of catalyst.

It was found that by performing the dryings at 150° C., the catalyst contains only 5.18% of sulfur and the catalyst contains 5.51% of sulfur by performing the dryings at 200° C.

Various conventional analyses make it possible to conclude that sulfur is present in the catalyst in the form of ammonium polysulfide.

The results obtained on catalyst Ketjen K 165/1,5E, processed by the ammonium sulfide, are as follows;

loss due to ignition at 500° C. (L.O.I. at 500° C.)
before processing : 0.81%
after processing: nitrogen: 26.76%

Carbon and sulfur analysis on the impregnated catalyst.

|     | before processing | after processing under nitrogen |
| --- | --- | --- |
| S % | 0.38 | 8.76 |
| C % | 0.08 | 0.12 |

In view of these results (in particular the values of L.O.I. at 500° C.), it is possible to say that the catalyst on the average is impregnated at 20% of the ammonium sulfide or 8.45% of sulfur by weight of dry and oxidized catalyst, which corresponds to the object sought.

The activation of the catalyst processed above is performed by making a hydrogen stream pass at 150° C. through a catalyst bed impregnated with polysulfide (under 30 bars).

When the bed has reached 130° C., the reaction starts up and the temperature rises to about 150° C.

The catalyst becomes black, due to the metal sulfides formed.

The analysis of the sulfur catalyst gives a sulfur value of 8.50%.

EXAMPLE 2 (ACCORDING TO THE INVENTION)

The preceding tests are repeated as indicated above. However, here, during the second impregnation, 25 ml of the commercial ammonium sulfide solution is used and the theoretical complement necessary for the stoichiometric sulfuration of the catalyst is provided by an aqueous diethanol disulfide solution.

At the end of the activation of the catalyst, the analysis of the sulfur catalyst also gives 8.50% as sulfur value.

The stability of the activities is improved in particular in prolonged tests (several hundred hours in pilot units).

EXAMPLE 3 (ACCORDING TO THE INVENTION)

The procedure is performed as in example 2 by successively using other additives instead of D.E.O.D.S. (diethanol disulfide or 2,2-dithiobis ethanol), namely:

2-mercaptoethanol, dimethyl sulfoxide ethyl thioethane, thioglycolic acid, 3-mercapto-1-propanol, dithioglycol, mercaptoacetic acid (M.A.A.) thiodiethylene glycol, dithio glycol and D.M.T.D. (2,5-dimercapto-1,3,4-thiodiazole).

Good results approximately equivalent to those obtained with the D.E.O.D.S., without, however, completely reaching the long durations of test performed with D.E.O.D.S., are obtained.

I claim:

1. Process of processing a new or regenerated catalyst, containing a support with a base of at least one metal oxide or a metalloid and at least one active metal, performed in the absence of hydrogen and comprising impregnating said catalyst with an aqueous ammonium sulfide solution at a temperature between 0° and 50°, in the presence of at least one sulfur additive selected in the group consisting of thiodiazoles, thio acids, thio amides, thiocyanates, thio esters, thiophenols, thiosemicarbazides, thioureas, mercapto alcohols of formula

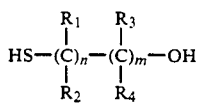

where n and m are whole numbers, $R_1$, $R_2$, $R_3$, $R_4$, identical or different, are atoms of hydrogen or alkyl, aryl, aralkyl, alkylaryl organic radicals, thiols of formula $R_1$—SH where R is an organic radical, thio ethers of formula $R_1$—S—$R_2$ where $R_1$ and $R_2$ are defined as above and the organic disulfides of formula $R_1$—S—S—$R_2$ where $R_1$ and $R_2$ are defined above.

2. Process according to claim 1 for processing a new or regenerated catalyst containing a support with a base of at least one metal oxide and a metalloid and at least one active metal, said process comprising:
   (a) in impregnating the catalyst at a temperature between 0° and 50° C. to its impregnation volume by an aqueous ammonium sulfide solution,
   (b) in drying the catalyst at a temperature less than 120° C.,
   (c) in again impregnating at least a second time the catalyst to its impregnation volume or to a lower volume, by an aqueous ammonium sulfide solution and at least one said additive,
   (d) in drying the catalyst at a temperature lower than 130° C.

3. Process according to claim 1 wherein the weight of the additive or additives used represents 5 to 50% relative to the weight of sulfur introduced in the catalyst.

4. Process according to claim 1, where said additive is HO—$C_2H_4$—S—S—$C_2H_4$—OH.

5. Process according to claim 2, wherein the weight of the additive or additives used represents 5 to 50% relative to the weight of sulfur introduced in the catalyst.

6. Process according to claim 2, where said additive is HO—$C_2H_4$—S—S—$C_2H_4$—OH.

7. Process according to claim 3, where said additive is HO—$C_2H_4$—S—S—$C_2H_4$—OH.

8. Process according to claim 5, where said additive is HO—$C_2H_4$—S—S—$C_2H_4$—OH.

9. A catalyst produced by a process according to claim 1.

10. A catalyst produced by a process according to claim 2.

11. A catalyst produced by a process according to claim 3.

12. A catalyst produced by a process according to claim 4.

13. A catalyst produced by a process according to claim 5.

14. A catalyst produced by a process according to claim 6.

15. A catalyst produced by a process according to claim 7.

16. A catalyst produced by a process according to claim 8.

17. A composition comprising ammonium sulfide and an additive selected form the group consisting of thiodiazoles, thio acids, thio amides, thiocyanates, thio esters, thiophenols, thiosemicarbazides, thioureas, mercapto alcohols of formula $$HS-(C)_n-(C)_m-OH$$
with substituents $R_2$, $R_3$ above and $R_2$, $R_4$ below where n and m are whole numbers, $R_1$, $R_2$, $R_3$, $R_4$, identical or different, are atoms of hydrogen or alkyl, aryl, aralkyl, alkylaryl organic radicals, thios of formula $R_1$—SH where R is an organic radical, thio ethers of formula $R_1$—S—$R_2$ where $R_1$ and $R_2$ are defined as above and the organic disulfides of formula $R_1$—S—S—$R_2$ where $R_1$ and $R_2$ are defined as above.

18. A composition according to claim 17, wherein said additive is HO—$C_2H_4$—S—S—$C_2H_4$—OH.

* * * * *